US011982329B2

(12) United States Patent
Oberdorfer

(10) Patent No.: US 11,982,329 B2
(45) Date of Patent: May 14, 2024

(54) CALIPER BRIDGE FOR A DISC BRAKE WITH MEANS FOR CONTROLLING ROTATION OF THREADED WEAR ADJUSTMENT TUBES

(71) Applicant: Bendix Commercial Vehicle Systems LLC, Avon, OH (US)

(72) Inventor: Erik W. Oberdorfer, Akron, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 168 days.

(21) Appl. No.: 17/680,687

(22) Filed: Feb. 25, 2022

(65) Prior Publication Data
US 2023/0272830 A1   Aug. 31, 2023

(51) Int. Cl.
*F16D 65/20*   (2006.01)
*F16D 65/00*   (2006.01)
*F16D 65/56*   (2006.01)
*F16D 55/00*   (2006.01)
*F16D 127/02*  (2012.01)

(52) U.S. Cl.
CPC ....... *F16D 65/567* (2013.01); *F16D 65/0068* (2013.01); *F16D 2055/0016* (2013.01); *F16D 2127/02* (2013.01)

(58) Field of Classification Search
CPC ............... F16D 65/0068; F16D 65/567; F16D 2055/0016; F16D 2127/02
USPC ........................... 188/196 B, 196 BA, 196 V
See application file for complete search history.

(56) References Cited

U.S. PATENT DOCUMENTS

| | | | | |
|---|---|---|---|---|
| 3,068,964 A | * | 12/1962 | Cox, Jr. ................. | F16D 65/546 188/196 D |
| 3,547,229 A | * | 12/1970 | Pollinger ........... | B61H 15/0028 188/71.9 |
| 3,746,133 A | * | 7/1973 | Hauth ................... | F16D 65/567 188/71.9 |
| 3,966,028 A | * | 6/1976 | Anderson ............. | F16D 55/224 188/71.9 |
| 4,014,414 A | * | 3/1977 | Yamamoto ............ | F16D 65/567 192/85.37 |
| 4,061,208 A | * | 12/1977 | Nishiyama ............ | F16D 65/567 188/71.9 |

(Continued)

FOREIGN PATENT DOCUMENTS

DE    102015104915 A1    10/2016

OTHER PUBLICATIONS

English (machine) translation of DE 10 2015 104 915 A1.

*Primary Examiner* — Christopher P Schwartz
(74) *Attorney, Agent, or Firm* — Reising Ethington P.C.

(57) ABSTRACT

A bridge for a disc brake caliper includes a body defining a first bore disposed about an axis. The first bore includes a plurality of threads. The body further defines a second bore extending radially from an outer surface of the body into the first bore. A tube is received within the first bore and supports a tappet at one end for engaging a friction pad. The tube is configured to receive one end of an adjustment shaft of a friction pad wear adjuster therein. The tube defines a plurality of threads on a radially outer surface configured for engagement with the plurality of threads in the first bore and at least one of the plurality of threads on the first tube defines a plurality of teeth. A detent extends through the second bore and engages the teeth to inhibit rotation of the tube within the body.

20 Claims, 6 Drawing Sheets

(56) References Cited

U.S. PATENT DOCUMENTS

| | | | |
|---|---|---|---|
| 4,840,257 A * | 6/1989 | Harrison | F16D 65/567 |
| | | | 188/199 |
| 5,568,845 A | 10/1996 | Baumgartner et al. | |
| 7,331,431 B2 | 2/2008 | Fischer et al. | |
| 7,926,626 B2 | 4/2011 | Iraschko | |
| 8,684,146 B2 | 4/2014 | Iraschko | |
| 9,677,632 B2 * | 6/2017 | Baukholt | B60T 13/743 |
| 10,598,238 B2 | 3/2020 | Oberdorfer | |

* cited by examiner

CALIPER BRIDGE FOR A DISC BRAKE WITH MEANS FOR CONTROLLING ROTATION OF THREADED WEAR ADJUSTMENT TUBES

BACKGROUND OF THE INVENTION a. Field of the Invention

This invention relates to disc brakes. In particular, the invention relates to a bridge for a caliper for a disc brake having means for controlling rotation of threaded wear adjustment tubes in the bridge to prevent unintentional movement of the tubes.

b. Background Art

A conventional caliper for a vehicle disc brake houses a bridge that functions as a piston to move a friction pad into engagement with one side of a rotor or brake disc in response to movement of a brake actuator. In addition to functioning as a piston, the bridge houses a mechanism that enables adjustment of the position of the friction pad in response to wear on the friction pad. In particular, the bridge includes one or more threaded bores configured to receive threaded tubes. The threaded tubes mount tappets at one end that engage the friction pad. The threaded tubes receive wear adjustment shafts within the opposite end of each tube. When adjustment of the friction pads is required due to wear on the friction pads, the shafts are rotated and cause corresponding rotation of the threaded tubes within the bridge to move the tubes and tappets further outward from the bridge and thereby adjust the position of the friction pad relative to the rotor in order to maintain a desired running clearance between the friction pads and the rotor.

In conventional air disc brake calipers, there may be unintended rotation of the threaded tubes within the bridge. These unintended rotational movements of the threaded tubes have the potential of altering the running clearance between the friction pads and the rotor which may negatively impact the brake performance.

The inventor herein has recognized a need for a bridge for a caliper for a disc brake that will minimize and/or eliminate one or more of the above-identified deficiencies.

BRIEF SUMMARY OF THE INVENTION

This invention relates to disc brakes. In particular, the invention relates to a bridge for a caliper for a disc brake having means for controlling rotation of threaded wear adjustment tubes in the bridge to prevent unintentional movement of the tubes.

A bridge for a caliper for a disc brake in accordance with one embodiment includes a body defining a first bore disposed about a first axis. The first bore includes a plurality of threads. The body further defines a second bore extending radially from an outer surface of the body into the first bore. The bridge further includes a tube configured to be received within the first bore. The tube supports a tappet at one end configured to engage a friction pad and the tube is configured to receive one end of an adjustment shaft of a friction pad wear adjuster therein. The tube defines a plurality of threads on a radially outer surface configured for engagement with the plurality of threads in the first bore of the body and at least one of the plurality of threads of the tube defines a first plurality of teeth. The bridge further includes a detent extending through the second bore in the body and configured to be received between first and second teeth of the first plurality of teeth.

A bridge for a caliper for a disc brake in accordance with another embodiment includes a body defining a first bore disposed about a first axis. The first bore includes a plurality of threads. The body further defines a second bore extending radially from an outer surface of the body into the first bore. The bridge further includes a tube configured to be received within the first bore. The tube supports a tappet at one end configured to engage a friction pad and the tube is configured to receive one end of an adjustment shaft of a friction pad wear adjuster therein. The tube defines a plurality of threads on a radially outer surface configured for engagement with the plurality of threads in the first bore of the body and at least one of the plurality of threads of the tube defines a first plurality of teeth. The bridge further includes anti-rotation means for engaging first and second teeth of the first plurality of teeth and inhibiting rotation of the tube relative to the body when a rotational force acting on the tube is less than a predetermined force.

A caliper for a disc brake e in accordance with one embodiment includes a housing including an actuator portion configured for location on a first side of a rotor and a reaction portion configured for location on a second side of a rotor. The caliper further includes a lever disposed within the actuator portion of the housing. The lever is configured for movement in response to movement of a brake actuator. The caliper further includes a bridge disposed within the actuator portion of the housing and in engagement with the lever. Movement of the lever causes corresponding movement of the bridge within the actuator portion of the housing in a first direction towards a first brake pad on the first side of the rotor and corresponding movement of the reaction portion of the housing in a second direction toward a second brake pad on the second side of the rotor. The bridge includes a body defining a first bore disposed about a first axis. The first bore includes a plurality of threads. The body further defines a second bore extending radially from an outer surface of the body into the first bore. The bridge further includes a tube configured to be received within the first bore. The tube supports a tappet at one end configured to engage the first friction pad and the tube is configured to receive one end of an adjustment shaft of a friction pad wear adjuster therein. The tube defines a plurality of threads on a radially outer surface configured for engagement with the plurality of threads in the first bore of the body and at least one of the plurality of threads of the tube defines a first plurality of teeth. The bridge further includes a detent extending through the second bore in the body and configured to be received between first and second teeth of the first plurality of teeth.

A bridge for a caliper for a disc brake in accordance with the present teachings represents an improvement as compared to bridges found in conventional calipers. In particular, the bridge includes means for preventing unintended rotation of the threaded wear adjustment tubes in the bridge that may otherwise result from the friction pads back driving the tubes during a braking event or from misalignment of components in the wear adjustment mechanism. As a result, the desired running clearance between the friction pads and the rotor can be maintained for improved brake performance.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
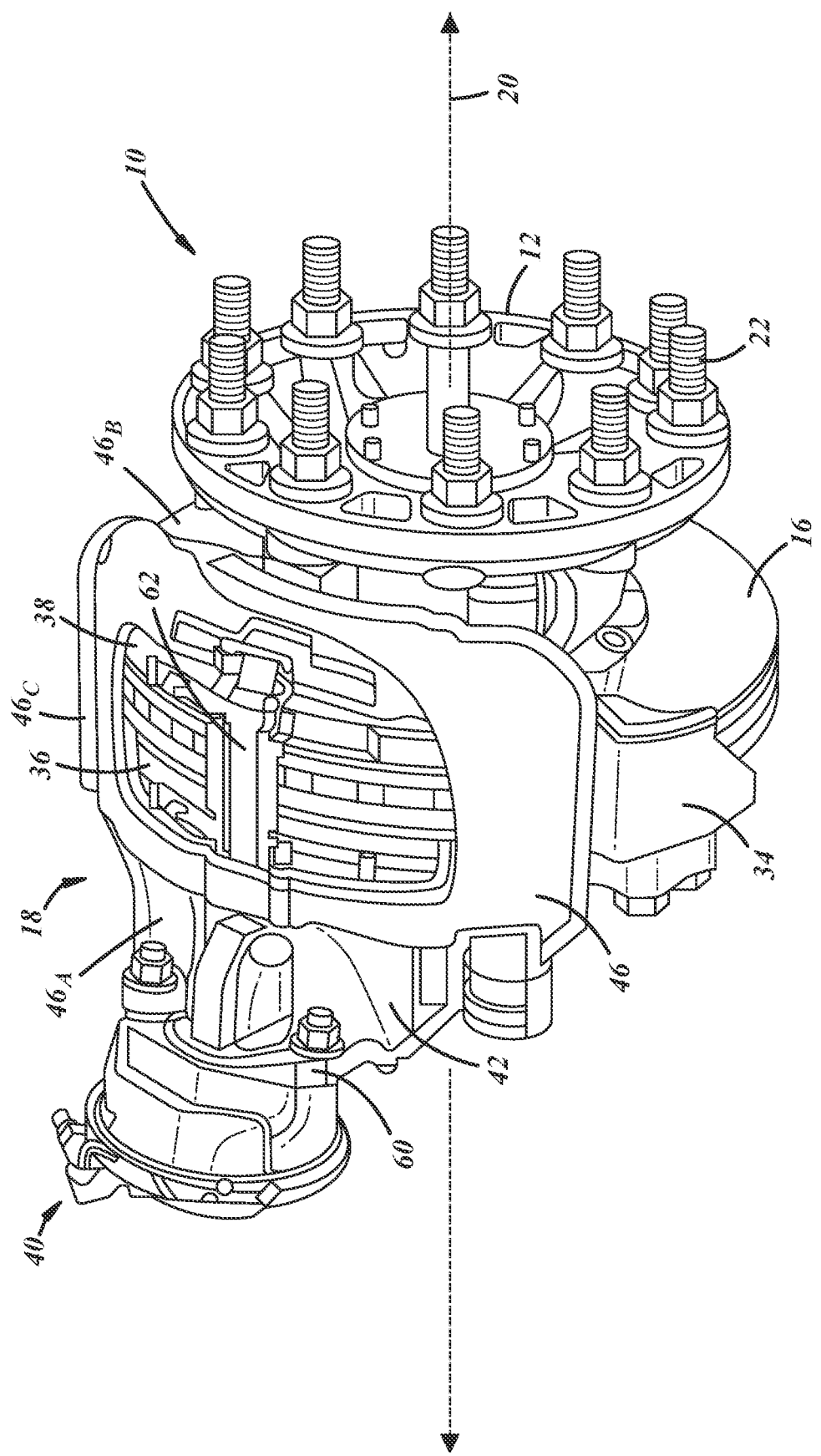
FIG. 1 is a perspective view of a disc brake assembly including a caliper in accordance with one embodiment of the present teachings mounted on a vehicle wheel end assembly.
Figure 2:
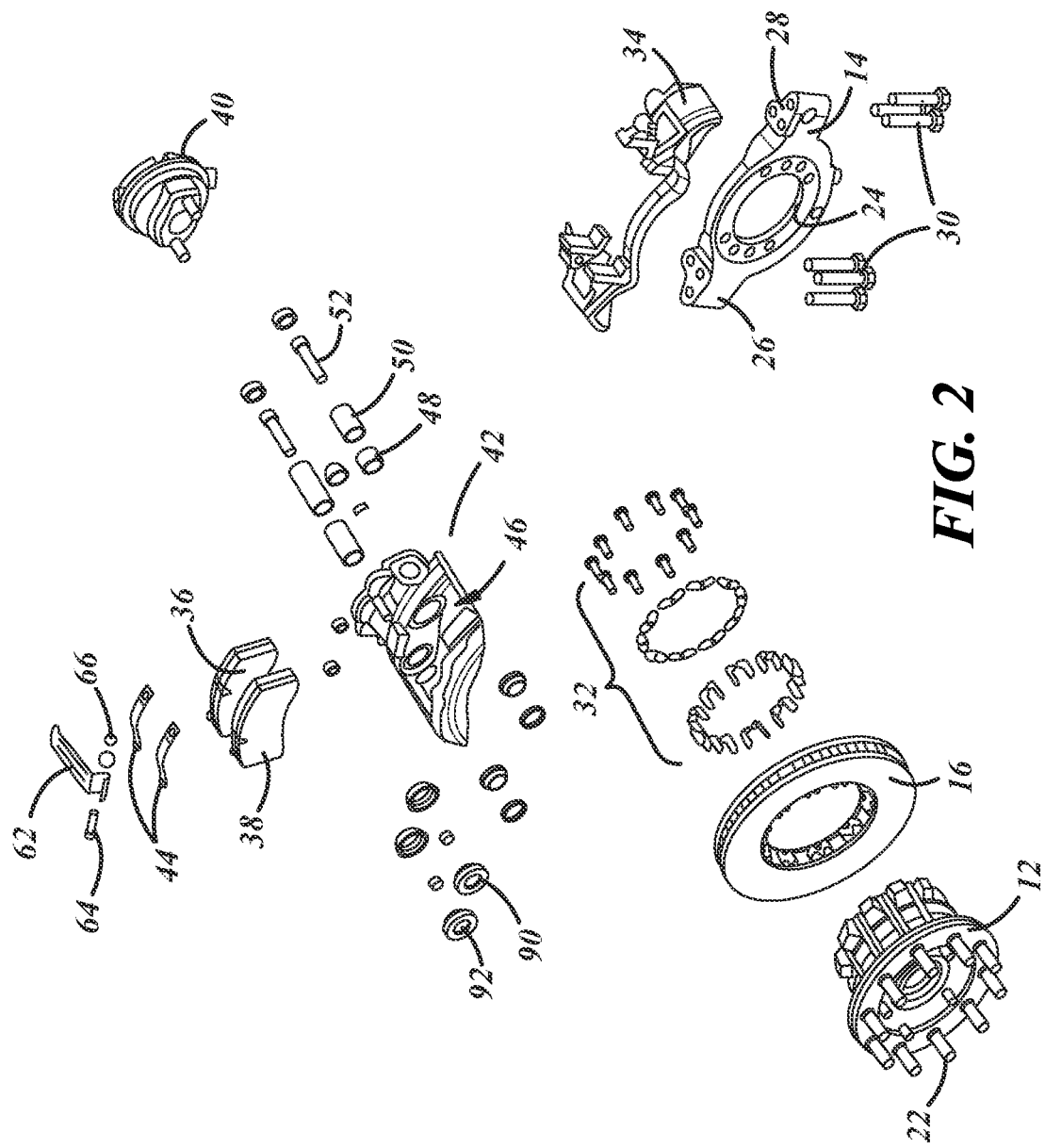
FIG. 2 is an exploded perspective view of the wheel end assembly and disc brake assembly shown in FIG. 1.

Referring now to the drawings wherein like reference numerals are used to identify identical components in the various views, FIGS. 1-2 illustrate a wheel end assembly 10 incorporating a disc brake having a caliper and a bridge for the caliper in accordance with one embodiment of the present teachings. Assembly 10 is particularly configured for use on heavy commercial vehicles such as trucks, trailers and buses, but it should be understood that assembly 10 may find application on a wide variety of vehicles. Assembly 10 may include a wheel hub 12, an anchor plate 14, a rotor 16 and a disc brake 18 in accordance with the present teachings.

Wheel hub 12 is provided for mounting a vehicle wheel on an axle of the vehicle. In the illustrated embodiment, hub 12 is configured for use with a steer axle of the vehicle. It should be understood, however, that hub 12 may alternatively be configured for use with a drive axle or trailer axle. Hub 12 may define a central bore configured to receive a stub axle and bearings that allow hub 12 to rotate relative to the axle about an axis 20. Hub 12 also includes a plurality of outwardly extending bolts 22 on which the wheel may be mounted for rotation with hub 12.

Anchor plate 14 is provided for mounting disc brake 18 to the vehicle. Referring to FIG. 2, anchor plate 14 defines a central aperture 24 through which a vehicle axle may extend. Plate 14 further defines mounting flanges 26, 28 configured to support brake 18 and through which fasteners 30 for brake 18 may extend. In the illustrated embodiment, fasteners 30 extend substantially perpendicular to the axis of rotation 20 of wheel nub 12. In an alternative embodiment, anchor plate 14 is configured such that fasteners 30 extend parallel to the axis of rotation.

Rotor 16 works together with disc brake 18 to establish a braking torque in a vehicle wheel in order to slow or stop rotation of the wheel and movement of the vehicle. Rotor 16 may be made from a variety of metals and metal alloys including iron. Rotor 16 is annular in shape and configured for mounting on wheel hub 12. Rotor 16 may be secured to hub 12 using conventional fasteners. Alternatively, as shown in FIG. 2, rotor 16 may define a plurality of splines in a radially inner perimeter configured to engage mating splines on a radially outer mounting surface of hub 12. Additional hardware 32 including spacers and fasteners may be used to maintain the position of rotor 16 on hub 12. Rotor 16 transmits a braking torque to hub 12 which in turn transmits the torque to the vehicle wheel. Rotor 16 may include a pair of braking discs connected by webs to increase the surface area of the rotor for use in dissipating heat from the rotor generated during braking into the air and thereby minimize heat distortion and optimize thermal stress endurance.

Disc brake 18 is provided to apply a braking torque to rotor 16 in order to slow or halt rotation of one or more vehicle wheels. Disc brake 18 is particularly adapted for use on heavy vehicles and may be used with wheels mounted on drive axles, steer axles or trailer axles. It should be understood, however, that brake 18 could be used on a wide variety of vehicles and in non-vehicular applications. Brake 18 includes a friction pad carrier 34, friction pads 36, 38, an actuator 40 and a caliper 42 in accordance with the present teachings.

Carrier 34 is provided to support friction pads 36, 38. Carrier 34 also absorbs circumferential loads during actuation of brake 18 and transfers those loads to the axle through anchor plate 14. Carrier 34 is rigidly mounted to the axle through anchor plate 14 using fasteners 30 that extend through anchor plate 14 and into carrier 34. Carrier 34 has a body that is configured to support friction pads 36, 38 and to locate friction pads 36, 38 on inboard and outboard sides of rotor 16.

Friction pads 36, 38 are provided to generate friction during engagement with rotor 16 in order to slow the rotation of rotor 16 and, ultimately, the vehicle wheel. Friction pads 36, 38 are supported on carrier 34 with friction pad 36 disposed on an inboards side of rotor 16 and friction pad 38 disposed on an outboard side of rotor 16. Each friction pad 36, 38 may include a friction material configured to engage rotor 16, a backing plate that supports the friction material and is engaged by an actuating mechanism of the brake and a bonding material that couples the friction material to the backing plate. Referring to FIG. 2, pads 36, 38 may be retained on carrier 34 using springs 44.

Actuator 40 is provided to control actuation of brake 18. In the illustrated embodiment, actuator 40 comprises a pneumatic service actuator. It should be understood, however, that actuator 40 may take on a variety of forms including actuators that are configured to operate brake 18 as both a parking and service brake. Actuator 40 may include a pushrod (not shown) that moves along an axis in response to forces generated by springs and fluid pressure in order to transmits force to caliper 42 in order to apply or release brake 18.

Figure 3:
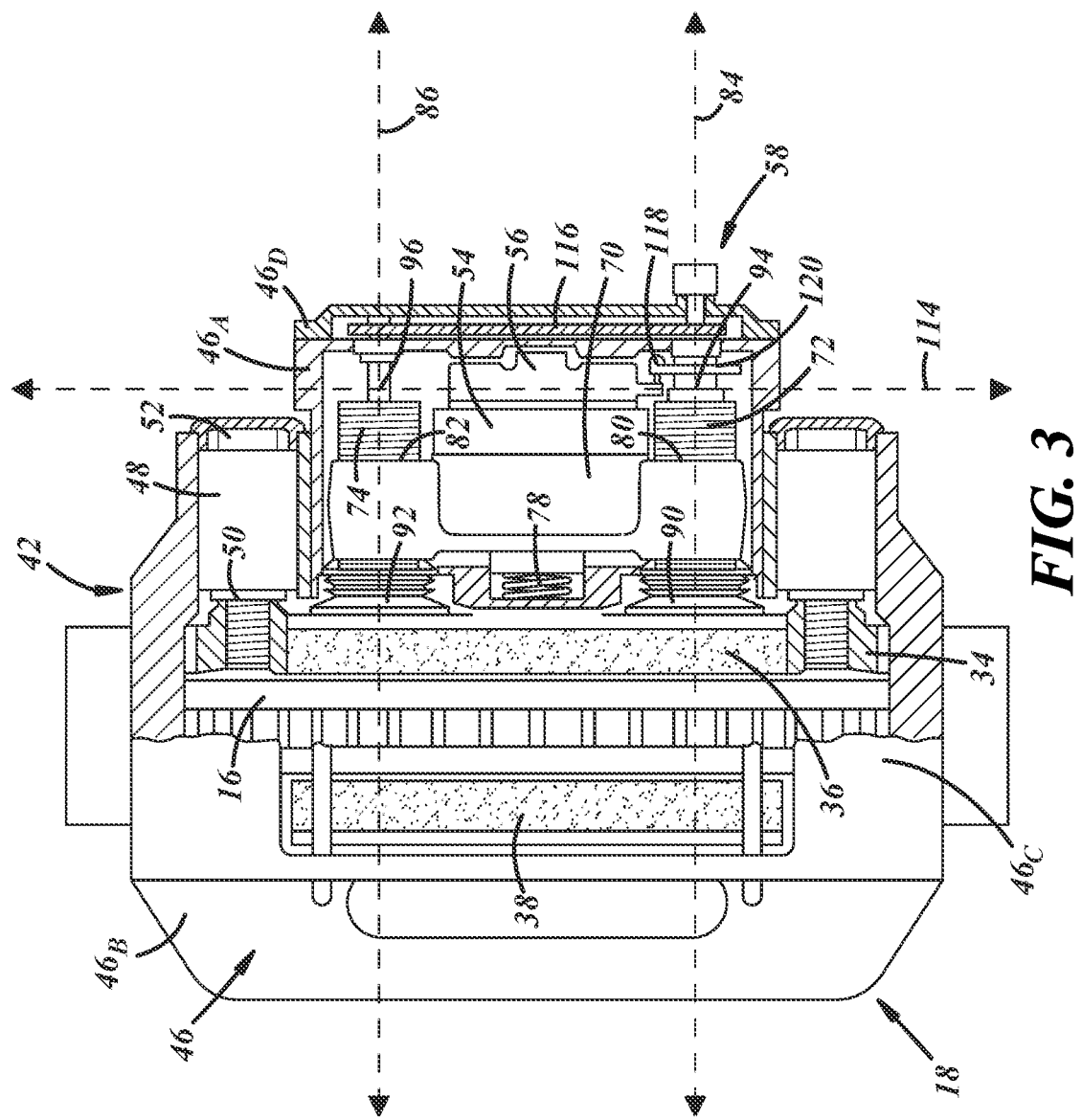
FIG. 3 is a partial cross-sectional view of a portion of the disc brake assembly of FIG. 1 including the caliper.

Caliper 42 is provided urge friction pads 36, 38 into engagement with rotor 16 in response to movement of the pushrod in actuator 40 to an applied position. Referring to FIG. 2, caliper 42 includes a housing 46 and means, such as bushings 48, guide pins 50, and fasteners 52, for coupling caliper 42 to carrier 34 and permitting movement of caliper 42 relative to carrier 34. Referring to FIG. 3, caliper 42 further includes, means, such as bridge 54 for urging inboard friction pad 36 towards the inboard side of rotor 16, and means, such as lever 56, for causing movement of bridge 54 and body 46 in response to movement of the actuator pushrod. Caliper 42 further includes means, such as friction pad wear adjuster 58, for adjusting the position of friction pads 36, 38 in order to compensate for wear on friction pads 36, 38 and maintain brake stroke. Caliper 42 may also include wear sensors (not shown) that generate electronic signals indicative of the condition of rotor 16 and/or friction pads 36, 38.

Housing 46 provides structural support for the other components of caliper 42 and protects those components from foreign objects and elements. Housing 46 also provides a means for urging outboard friction pad 38 against the outboard side of rotor 16. Referring to FIG. 3, housing 46 may include an actuator portion 46A, a reaction portion 46B, one or more connecting portions 46c that connect portions 46A, 46B and a cover portion 46D. Actuator portion 46A is disposed on the inboard side of rotor 16 and houses bridge 54, lever 56 and several components of adjuster 58. Referring to FIG. 1, actuator portion 46A is also configured to support brake actuator 40 and defines a mounting flange 60 for actuator 40 that defines a bore through which the pushrod of actuator 40 extends to contact lever 56. Referring again to FIG. 3, in response to movement of lever 56 by actuator 40 during application of brake 18, bridge 54 is moved to the left in FIG. 3 and urges inboard friction pad 36 towards, and into engagement with, the inboard side of rotor 16 while body 46 is moved to the right in FIG. 3 such that reaction portion 46B engages outboard friction pad 38 and urges outboard friction pad 38 towards, and into engagement with, the outboard side of rotor 16. Referring to FIGS. 1-2, reaction portion 46B may support a friction pad retainer 62 that extends from reaction portion 46B to actuator portion 46A and is disposed radially outwardly of rotor 16 and friction pads 36, 38. Referring to FIG. 2, retainer 62 may be secured to reaction portion 46B by a pin 64 and spring clip 66 or other suitable means for maintaining retainer 62 in a closed position. Retainer 62 may be moved to an open position or removed when access to friction pads 36, 38 is required during maintenance. Referring again to FIG. 3, connecting portions 46c are provided to connect actuator portion 46A and reaction portion 46B. Connecting portions 46c extend between the actuator portion 46A and the reaction portion 46B and are configured to be disposed radially outward rotor 16. Cover portion 46D is secured to actuator portion 46A and acts as a cover for, and allows access to, certain components of adjuster 58.

Referring again to FIG. 2, bushings 48, guide pins 50 and bolts 52 provide a means for coupling caliper 42 to carrier 34 and permitting movement of caliper 42 relative to carrier 34. Actuator portion 46A of body 46 defines bores (not shown) that are aligned with carrier 34 in a direction parallel to rotational axis 18 and that are configured to receive bushings 48, pins 50 and bolts 52 therein. Pins 50 extend through the bores and engage a face of carrier 34 which is shaped to receive one longitudinal end of each pin 50. Each pin 50 has a counterbored hole that aligns with a corresponding bore in carrier 34 and bolts 52 are inserted into the counterbored holes and the aligned bores in carrier 34 to secure pins 50 against carrier 34. Bushings 48 are disposed about pins 50 within the bores in actuator portion 46A of caliper body 46 and allow body 46 to move relative to carrier 34 in a direction parallel to axis 18.

Figure 4:
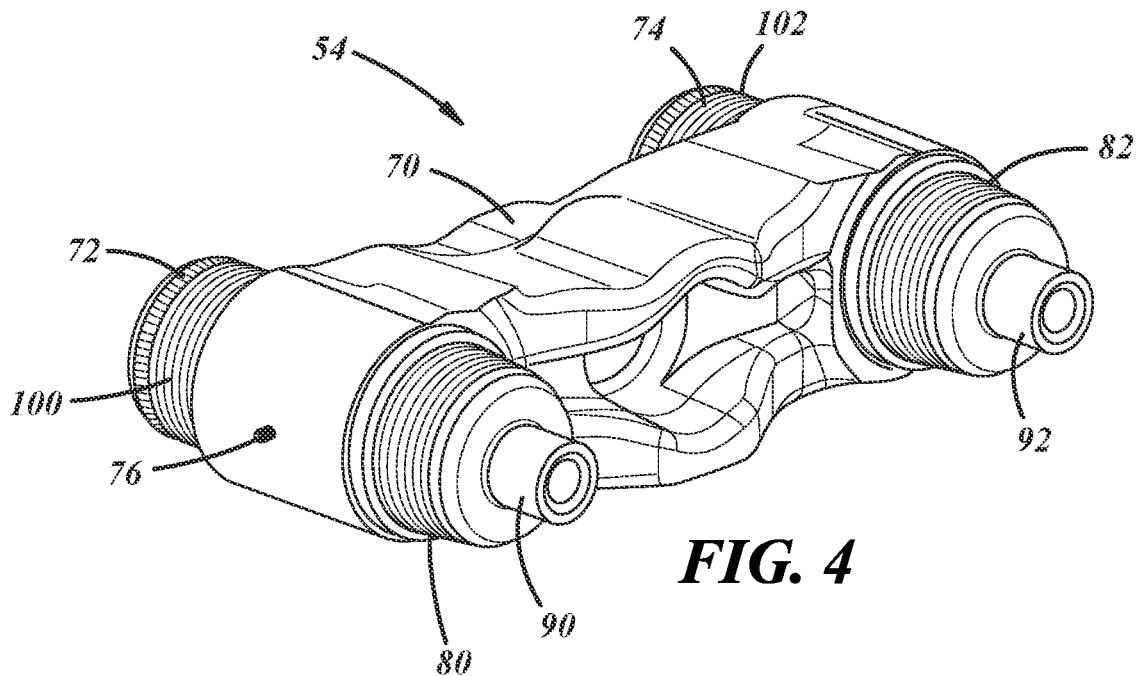
FIGS. 4-5 are perspective views of a bridge for a caliper for a disc brake in accordance with one embodiment of the present teachings.
Figure 5:
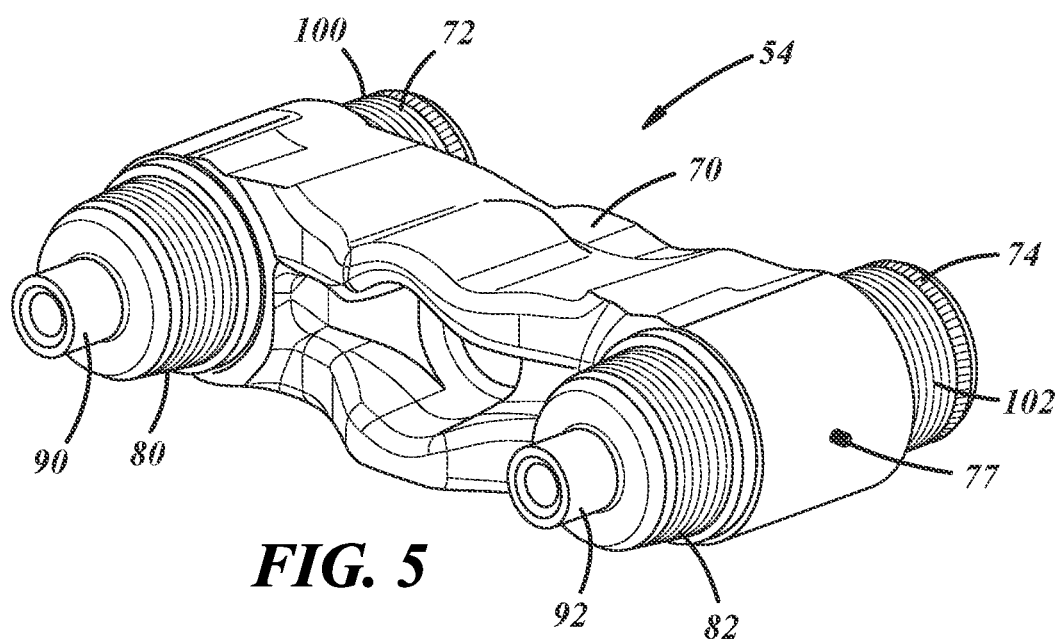

Referring again to FIG. 3, bridge 54 provides a means for urging inboard friction pad 36 towards the inboard side of rotor 16. Bridge 54 includes a body 70, and threaded tubes 72, 74. Referring to FIGS. 4-5, in accordance with the present teachings, bridge 54 may further include anti-rotation means, such as detents 76, 77 for engaging the tubes 72, 74 and inhibiting rotation of the tubes 72, 74 relative to body 70 when a rotational force acting on the tubes 72, 74 is less than a predetermined force. Although the illustrated embodiment shows a bridge 54 configured to receive multiple threaded tubes 72, 74, in an alternative embodiment the bridge 54 may be configured to receive a single threaded tube (in which a corresponding one of the detents may be omitted).

Figure 8:
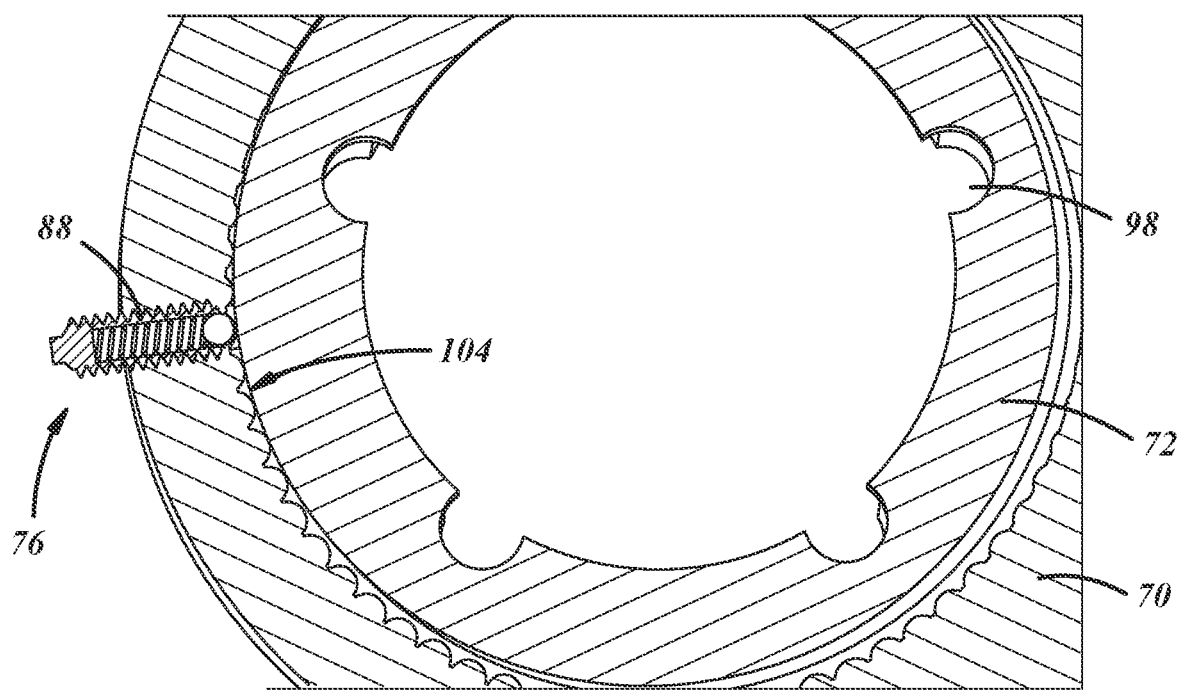
FIG. 8 is a cross-sectional view of a portion of the bridge of FIGS. 4-5.
Figure 9:
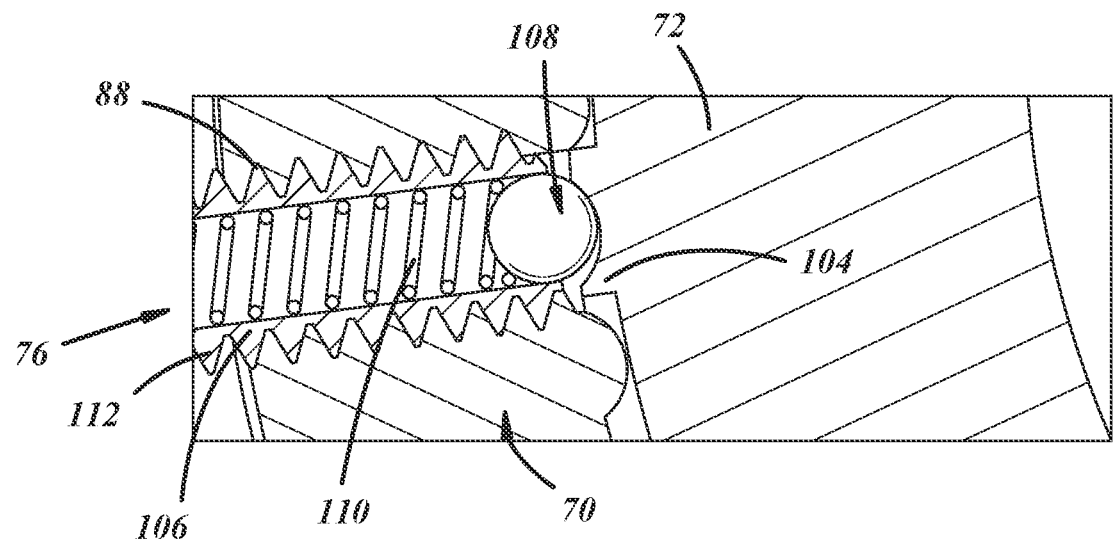
FIG. 9 is an enlarged view of a portion of FIG. 8.

Body 70 supports tubes 72, 74 for movement with body 70 during application of brake 18 and supports tubes 72, 74 for movement relative to body 70 when adjustments are required to compensate for wear in friction pads 36, 38. Referring again to FIG. 3, an inboard end of body 70 is coupled to lever 56 such that body 70 moves in response to movement of lever 56 caused by movement of the pushrod of actuator 40. An outboard end of body 70 is configured to receive a return spring 78 that is disposed between opposed spring seats in body 70 and a wall of actuator portion 46A of caliper body 46. Spring 78 biases body 70 away from inboard friction pad 36 when brake 18 is released. Body 70 further defines bores 80, 82 at either circumferential end that are disposed about parallel axes 84, 86 and configured to received threated tubes 72, 74 (in the alternative embodiment referenced above, the body may define a single bore configured to receive a single threaded tube). Each bore 80, 82 is a threaded bore having a plurality of threads. The threads may extend along the entire length of each bore 80, 82 or along a portion of each bore 80, 82. Referring to FIGS. 8-9, body 70 may further define one or more bores 88 that extend radially from an outer surface of body 70 into bores 80, 82 for a purpose discussed below. Bores 88 may again be threaded bores having a plurality of threads.

Figure 6:
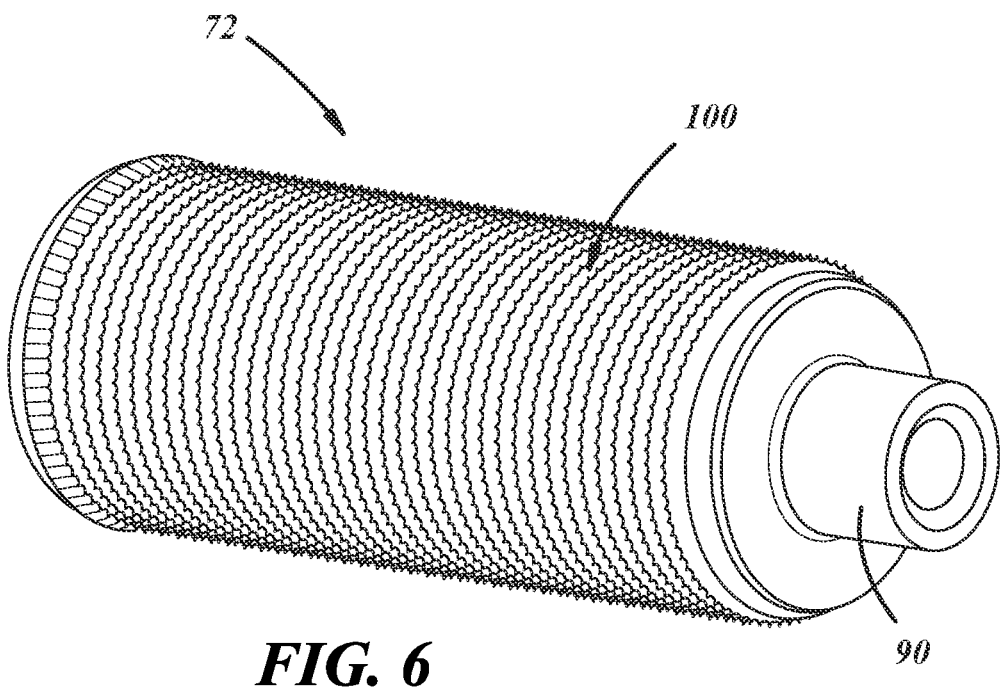
FIG. 6 is a perspective of a threaded wear adjustment tube of the bridge of FIGS. 4-5.
Figure 7:
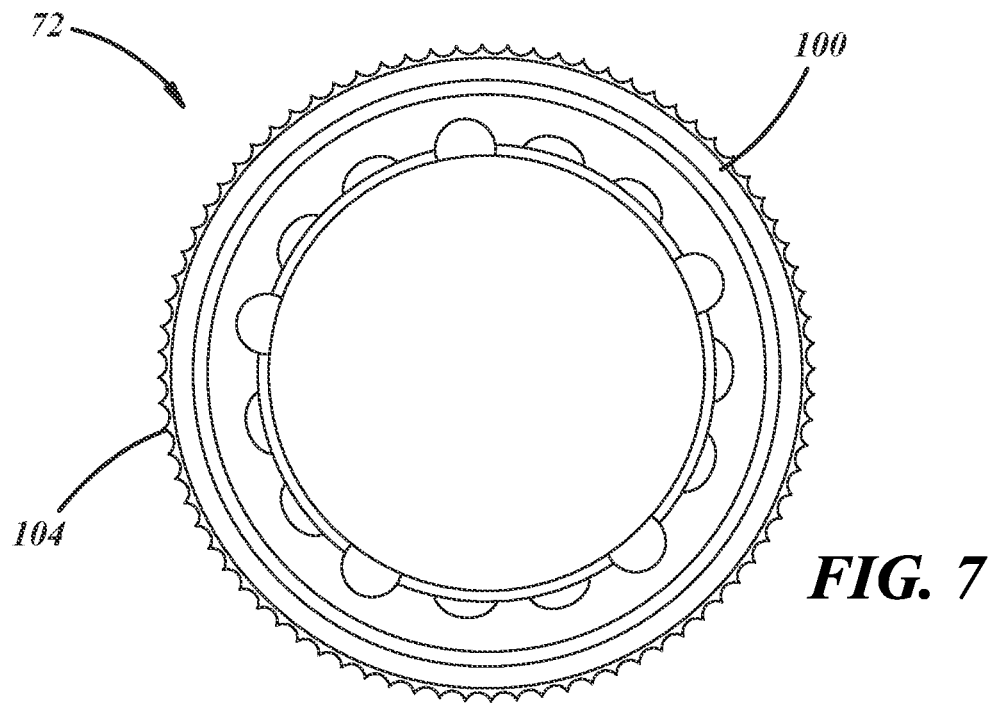
FIG. 7 is a cross-sectional view of the threaded wear adjustment tube of FIG. 6.

Referring again to FIG. 3, tubes 72, 74 are provided to engage friction pad 36 during application of brake 18. Tubes 72, 74 are also provided to enable adjustment of the position of friction pad 36 relative to rotor 16 upon wear of friction pads, 36, 38. Tubes 72, 74 are substantially cylindrical in shape and are configured be received within bores 80, 82. One end of each tube 72, 74 supports a tappet 90, 92, respectively, for engagement with friction pad 36. Tubes 72, 74 extend outward from body 70 and through openings in actuator portion 46A of caliper body 46 such that tappets 90, 92 engage inboard friction pad 36 when brake 18 is applied. The other end of each tube 72, 74 is configured to receive one end of an adjustment shaft 94, 96, respectively, of adjuster 58 therein. Referring to FIG. 8, the inner diameter of each tube 72, 74 may define one or more keyways 98 configured to receive corresponding keys on shafts 94, 96 in order to couple tubes 72, 74 to shafts 94, 96 for rotation with shafts 90, 92. It should be understood, however, that tubes 72, 74 may be coupled to shafts 94, 96 for rotation with shafts 94, 96 in a variety of ways. Referring to FIGS. 4-6, each tube 72, 74 defines a plurality of threads 100, 102, respectively, on a radially outer surface that are configured for engagement with the corresponding threads in bores 80, 82 of body 70 to allow tubes 72, 74 to move relative to body 70 along axes 84, 86 and adjust the position of friction pad 36 relative to rotor 16. Referring to FIG. 7, in accordance with the present teachings, one or more threads 100, 102 on tubes 72, 74 is formed to define a plurality of teeth 104. Teeth 104 may be formed in one or more threads 100, 102 on one of tubes 72, 74 or on both tubes 72, 74. Further, teeth 104 may be formed in one or more pluralities of adjacent threads 100, 102 on either or both of tubes 72, 74 such that teeth 104 extend over one or more longitudinal portions of threads 100, 102 on tubes 72, 74 or may be formed in all of the threads 100, 102 on either or both of tubes 72, 74 such that the teeth 104 extend along the entire length of the tubes 72, 74 or at least the entire length of the threads 100, 102 formed on the tube 72, 74. The threads 100, 102 in which teeth 104 are formed may, for example, be selected based on knowledge regarding when unintentional movement of tubes 72, 74 relative to body 70 is most likely to occur (e.g., based on the age of friction pads 36, 38). The circumferential spacing between teeth 104 may be less than the spacing between teeth formed in the races of a ball-ramp coupling of adjuster 58 described in greater detail hereinbelow.

Referring now to FIGS. 8-9, detents 76, 77 comprise anti-rotation means for engaging the teeth 104 on tubes 72, 74 and inhibiting rotation of the tubes 72, 74 relative to body 70 when a rotational force acting on the tubes 72, 74 is less than a predetermined force. In particular, detents 76, 77 are configured to allow rotation of tubes 72, 74 relative to body 70 when the force causing rotation corresponds to a level of force expected to be exerted by adjuster 58 through adjustment shafts 94, 96 when adjusting for wear in friction pads 36, 38. Conversely, detents 76, 77 prevent rotation of tubes 72, 74 relative to body 70 when the rotational force acting on tubes 72, 74 is less than this force and results from, for example, back driving of tubes 72, 74 during a braking event or from other forces such as vibration which may cause misalignment of components in the adjuster 58. Detents 76, 77 extend through radial bores 88 in body 70 and are configured to be received between adjacent teeth 104 in threads 100, 102. Referring to FIG. 9, each detent 76, 77 may include a tubular body 106, a plunger 108, and a spring 110. Body 106 may be generally cylindrical in shape and open at end to receive spring 110 and plunger 108 therein. A radially outer surface of body 106 may define a plurality of threads 112 configured to engage corresponding threads in bore 88. Body 106 may include markings providing an indication of the desired depth of body 106 within bore 88 for purposes of assembly. Plunger 108 is partially disposed within body 106, but also partially projects from body 108 to engage teeth 104. Plunger 108 has a shape that is complementary to the shape of teeth 104. In the illustrated embodiment, plunger 108 comprises a ball and teeth 104 are shaped to define semi-circular recesses between adjacent teeth. It should be understood, however, that the shape of teeth 104 and plunger 108 may vary. Spring 110 is disposed within body 106 and biases plunger 108 outward from body 106 and into engagement with teeth 104. Spring 110 applies a force to plunger 108 such that rotation of tubes 72, 74 relative to body 70 is prevented unless the force acting on tubes 72, 74 at least equals a predetermined force indicative of an intentional adjustment to compensate for friction pad wear. The force by spring 110 to plunger 108 may be varied by the use of different springs 110 and/or by varying the depth of body 106 within bore 88. In the illustrated embodiment, a detent 76, 77 is illustrated in connection with each tube 72, 74. It should be understood, however, that a single detent 76 or 77 could be used (in which case, the detent is preferably employed on the tube receiving the adjuster shaft of wear adjuster 58 as opposed to the follower shaft of wear adjuster 58 (see discussion below)). Further, it should also be understood that more than one detent 76, 77 could be used in connection with either tube 72, 74.

Referring again to FIG. 3, lever 56 provides a means to cause movement of bridge 54 and caliper body 46 in response to movement of the pushrod of actuator 40 and to multiply the force of actuator 40. Lever 56 is disposed within actuator portion 46A of caliper body 46. One end of lever 56 is configured to receive one end of the pushrod of actuator 40 and may define a semi-hemispherical recess for receiving the end of the pushrod in some embodiments. The opposite end of lever 56 is configured to engage bridge 54. A portion of lever 56 is supported on an eccentric bearing (not shown) located on an internal surface of actuator portion 46A of caliper body 46 opposite bridge 54. The bearing minimizes friction and hysteresis and lever 56 pivots on the bearing about axis 114. During application of brake 18, the pushrod of actuator 40 extends further into actuator portion 46A of caliper body 46. The extension of the pushrod causes movement of lever 56 which in turn urges bridge 54, and tappets 90, 92 in a first direction (to the left in FIG. 3) to force inboard friction pad 36 towards the inboard side of rotor 16. The same action forces caliper body 46 in a second, opposite direction (to the right in FIG. 3) to bring reaction portion 46B of body 46 into engagement with outboard friction pad 38 and force outboard friction pad 38 towards the outboard side of rotor 16.

Friction pad wear adjuster 58 provides a means for adjusting the position of friction pads 36 38 in order to compensate for wear on friction pads 36, 38 and maintain brake stroke. Adjustment mechanisms are conventional in the art and exemplary adjustment mechanisms are shown in U.S. Pat. Nos. 7,926,626 B2 and 8,684,146 B2, the entire disclosures of which are incorporated herein by reference. Therefore, adjuster 58 will not be described in detail herein. Among other components, adjuster 58 includes adjuster shaft 94, follower shaft 96 and means, such as chain 116, for synchronizing rotation of shafts 94, 96. One end of each shaft 94, 96 is disposed within a corresponding tube 72, 74 in bridge 54 and is coupled to the tube 72, 74, for rotation therewith about axes 84, 86. The opposite end of each shaft 94, 96 projects from the corresponding tube 72, 74 and supports a chain wheel or sprocket. Chain 116 is disposed on the chain wheels or sprockets such that rotation of adjuster shaft 92 and tube 72 results in corresponding rotation of follower shaft 94 and tube 74. Lever 56 include a pin 118 disposed within a shifting fork 120 disposed about adjuster shaft 94. In the event of wear on friction pads 36, 38, the movement of lever 56 and pin 118 as the brake is applied will cause movement of shift fork 120. As described in greater detail in U.S. Pat. Nos. 7,926,626 B2 and 8,684,146 B2, movement of the shift fork 120 transmits a rotational force to adjuster shaft 94 and tube 72 through a ball ramp coupling (and, consequently, follower shaft 96 and tube 74) in order to reposition friction pads 36, 38 and maintain a constant gap between friction pads 36, 38 and rotor 16. The anti-rotation force applied by detents 76, 77 against tubes 72, 74 is less than the rotational force generated by adjuster 58.

A bridge 54 for a caliper 42 for a disc brake 18 in accordance with the invention represents an improvement as compared to bridges found in conventional calipers. In particular, the bridge 54 includes means 76, 77 for preventing unintended rotation of the threaded wear adjustment tubes 72, 74 in the bridge 54 that may otherwise result from the friction pads 36, 38 back driving the tubes 72, 74 during a braking event or from misalignment of components in the wear adjustment mechanism 58. As a result, the desired running clearance between the friction pads 36, 38 and the rotor 16 can be maintained for improved brake performance.

While the invention has been shown and described with reference to one or more particular embodiments thereof, it will be understood by those of skill in the art that various changes and modifications can be made without departing from the spirit and scope of the invention.

What is claimed is:

1. A bridge for a caliper for a disc brake, comprising:
 a body defining a first bore disposed about a first axis, the first bore including a plurality of threads, the body further defining a second bore extending radially from an outer surface of the body into the first bore;
 a first tube configured to be received within the first bore, the first tube supporting a first tappet at one end configured to engage a friction pad and the first tube configured to receive one end of a first adjustment shaft of a friction pad wear adjuster therein, the first tube defining a plurality of threads on a radially outer surface configured for engagement with the plurality of threads in the first bore of the body, at least one of the plurality of threads of the first tube defining a first plurality of teeth; and,
a first detent extending through the second bore in the body and configured to be received between first and second teeth of the first plurality of teeth.

2. The bridge of claim 1 wherein the body defines a third bore disposed about a second axis parallel to the first axis, the third bore including a plurality of threads, and the body further defines a fourth bore extending radially from the outer surface of the body into the third bore, the bridge further comprising:
a second tube configured to be received within the third bore, the second tube supporting a second tappet at one end configured to engage the friction pad and the second tube configured to receive one end of a second adjustment shaft of the friction pad wear adjuster therein, the second tube defining a plurality of threads on a radially outer surface configured for engagement with the plurality of threads in the third bore of the body, at least one of the plurality of threads of the second tube defining a second plurality of teeth; and,
a second detent extending through the fourth bore in the body and configured to be received between first and second teeth of the second plurality of teeth.

3. The bridge of claim 1 wherein a plurality of adjacent threads of the plurality of threads on the first tube define the first plurality of teeth, each of the first plurality of teeth extending along the length of the plurality of adjacent threads.

4. The bridge of claim 1 wherein all of the plurality of threads on the first tube define the first plurality of teeth, each of the first plurality of teeth extending along the length of the plurality of threads on the first tube.

5. The bridge of claim 1 wherein the first detent includes
a tubular body;
a plunger at least partially disposed within the tubular body; and,
a spring disposed within the tubular body and biasing the plunger outward from the tubular body.

6. The bridge of claim 5 wherein the plunger comprises a ball.

7. The bridge of claim 5 wherein the tubular body defines a plurality of threads on a radially outer surface configured to engage a corresponding plurality of threads formed in the second bore.

8. A bridge for a caliper for a disc brake, comprising:
a body defining a first bore disposed about a first axis, the first bore including a plurality of threads, the body further defining a second bore extending radially from an outer surface of the body into the first bore;
a first tube configured to be received within the first bore, the first tube supporting a first tappet at one end configured to engage a friction pad and the first tube configured to receive one end of a first adjustment shaft of a friction pad wear adjuster therein, the first tube defining a plurality of threads on a radially outer surface configured for engagement with the plurality of threads in the first bore of the body, at least one of the plurality of threads of the first tube defining a first plurality of teeth; and,
first anti-rotation means for engaging first and second teeth of the first plurality of teeth and inhibiting rotation of the first tube relative to the body when a rotational force acting on the first tube is less than a first predetermined force.

9. The bridge of claim 8 wherein the body defines a third bore disposed about a second axis parallel to the first axis, the third bore including a plurality of threads, and the body further defines a fourth bore extending radially from the outer surface of the body into the third bore, the bridge further comprising:
a second tube configured to be received within the third bore, the second tube supporting a second tappet at one end configured to engage the friction pad and the second tube configured to receive one end of a second adjustment shaft of the friction pad wear adjuster therein, the second tube defining a plurality of threads on a radially outer surface configured for engagement with the plurality of threads in the third bore of the body, at least one of the plurality of threads of the second tube defining a second plurality of teeth; and,
second anti-rotation means for engaging first and second teeth of the second plurality of teeth and inhibiting rotation of the second tube relative to the body when a rotational force acting on the second tube is less than a second predetermined force.

10. The bridge of claim 8 wherein a plurality of adjacent threads of the plurality of threads on the first tube define the first plurality of teeth, each of the first plurality of teeth extending along the length of the plurality of adjacent threads.

11. The bridge of claim 8 wherein all of the plurality of threads on the first tube define the first plurality of teeth, each of the first plurality of teeth extending along the length of the plurality of threads on the first tube.

12. The bridge of claim 8 wherein the first anti-rotation means includes
a tubular body;
a plunger at least partially disposed within the tubular body; and,
a spring disposed within the tubular body and biasing the plunger outward from the tubular body.

13. The bridge of claim 12 wherein the plunger comprises a ball.

14. A caliper for a disc brake, comprising:
a housing including
an actuator portion configured for location on a first side of a rotor, and,
a reaction portion configured for location on a second side of a rotor;
a lever disposed within the actuator portion of the housing the lever configured for movement in response to movement of a brake actuator; and,
a bridge disposed within the actuator portion of the housing and in engagement with the lever, movement of the lever causing corresponding movement of the bridge within the actuator portion of the housing in a first direction towards a first friction pad on the first side of the rotor and corresponding movement of the reaction portion of the housing in a second direction toward a second friction pad on the second side of the rotor;
wherein the bridge includes
a body defining a first bore disposed about a first axis, the first bore including a plurality of threads, the body further defining a second bore extending radially from an outer surface of the body into the first bore;

a first tube configured to be received within the first bore, the first tube supporting a first tappet at one end configured to engage the first friction pad and the first tube configured to receive one end of a first adjustment shaft of a friction pad wear adjuster therein, the first tube defining a plurality of threads on a radially outer surface configured for engagement with the plurality of threads in the first bore of the body, at least one of the plurality of threads of the first tube defining a first plurality of teeth; and, a first detent extending through the second bore in the body and configured to be received between first and second teeth of the first plurality of teeth.

15. The bridge of claim 14 wherein the body defines a third bore disposed about a second axis parallel to the first axis, the third bore including a plurality of threads, and the body further defines a fourth bore extending radially from the outer surface of the body into the third bore, the bridge further comprising:

a second tube configured to be received within the third bore, the second tube supporting a second tappet at one end configured to engage the first friction pad and the second tube configured to receive one end of a second adjustment shaft of the friction pad wear adjuster therein, the second tube defining a plurality of threads on a radially outer surface configured for engagement with the plurality of threads in the third bore of the body, at least one of the plurality of threads of the second tube defining a second plurality of teeth; and, a second detent extending through the fourth bore in the body and configured to be received between first and second teeth of the second plurality of teeth.

16. The caliper of claim 14 wherein a plurality of adjacent threads of the plurality of threads on the first tube define the first plurality of teeth, each of the first plurality of teeth extending along the length of the plurality of adjacent threads.

17. The caliper of claim 14 wherein all of the plurality of threads on the first tube define the first plurality of teeth, each of the first plurality of teeth extending along the length of the first plurality of threads on the first tube.

18. The caliper of claim 14 wherein the first detent includes a tubular body;

a plunger at least partially disposed within the tubular body; and, a spring disposed within the tubular body and biasing the plunger outward from the tubular body.

19. The caliper of claim 18 wherein the plunger comprises a ball.

20. The caliper of claim 18 wherein the tubular body defines a plurality of threads on a radially outer surface configured to engage a corresponding plurality of threads formed in the second bore.

* * * * *